(12) United States Patent
Bhagatkar et al.

(10) Patent No.: US 11,554,741 B2
(45) Date of Patent: Jan. 17, 2023

(54) VEHICLE UPPER SEAT PORTION WITH FAR SIDE AIRBAG MODULE

(71) Applicant: Volvo Car Corporation, Gothenburg (SE)

(72) Inventors: Buddhadeep Bhagatkar, Gothenburg (SE); Peter Setterberg, Partille (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/524,799

(22) Filed: Nov. 12, 2021

(65) Prior Publication Data
US 2022/0153221 A1    May 19, 2022

(30) Foreign Application Priority Data

Nov. 19, 2020  (EP) .................................... 20208706

(51) Int. Cl.
*B60R 21/207*    (2006.01)
*B60R 21/231*    (2011.01)

(52) U.S. Cl.
CPC ...... *B60R 21/207* (2013.01); *B60R 21/23138* (2013.01); *B60R 2021/23146* (2013.01)

(58) Field of Classification Search
None
See application file for complete search history.

(56) References Cited

U.S. PATENT DOCUMENTS

| 9,932,012 B1 | 4/2018 | Line et al. |
| 10,252,690 B2 * | 4/2019 | Seo ................... B60R 21/2165 |
| 11,260,820 B1 * | 3/2022 | Patel .................... B60R 21/207 |
| 2017/0349131 A1 | 12/2017 | Line et al. |

FOREIGN PATENT DOCUMENTS

| DE | 102016103613 A1 | 9/2016 | |
| DE | 102019130849 A1 * | 5/2021 | ........... B60R 21/207 |
| WO | WO-2013094600 A1 * | 6/2013 | ........... B60R 21/201 |
| WO | WO-2013141208 A1 * | 9/2013 | ........... B60R 21/207 |

OTHER PUBLICATIONS

Mar. 24, 2021 European Search Report issued in International Application No. 20208706.

* cited by examiner

*Primary Examiner* — Faye M Fleming
(74) *Attorney, Agent, or Firm* — Clements Bernard Walker; Christopher L. Bernard

(57) ABSTRACT

A vehicle seat upper portion, having a front side, a rear side, a first lateral side and a second lateral side, and including: a frame structure; upholstery extending across the first lateral side and having an edge attached to a side trim list; a back panel at the rear side of and mounted to the frame structure including a main surface and two lateral surfaces; and a far side airbag module mounted on the frame structure including a side airbag, wherein the far side airbag module, on a side facing away from the frame structure, has a first hook, and the back panel on an inner lateral side has a second hook for engaging the first hook such that the hooks urge the lateral side of the back panel away from the upholstery to form a gap for passage of the deploying airbag, before the airbag contacts any of the back panel, upholstery and/or side trim list.

15 Claims, 7 Drawing Sheets

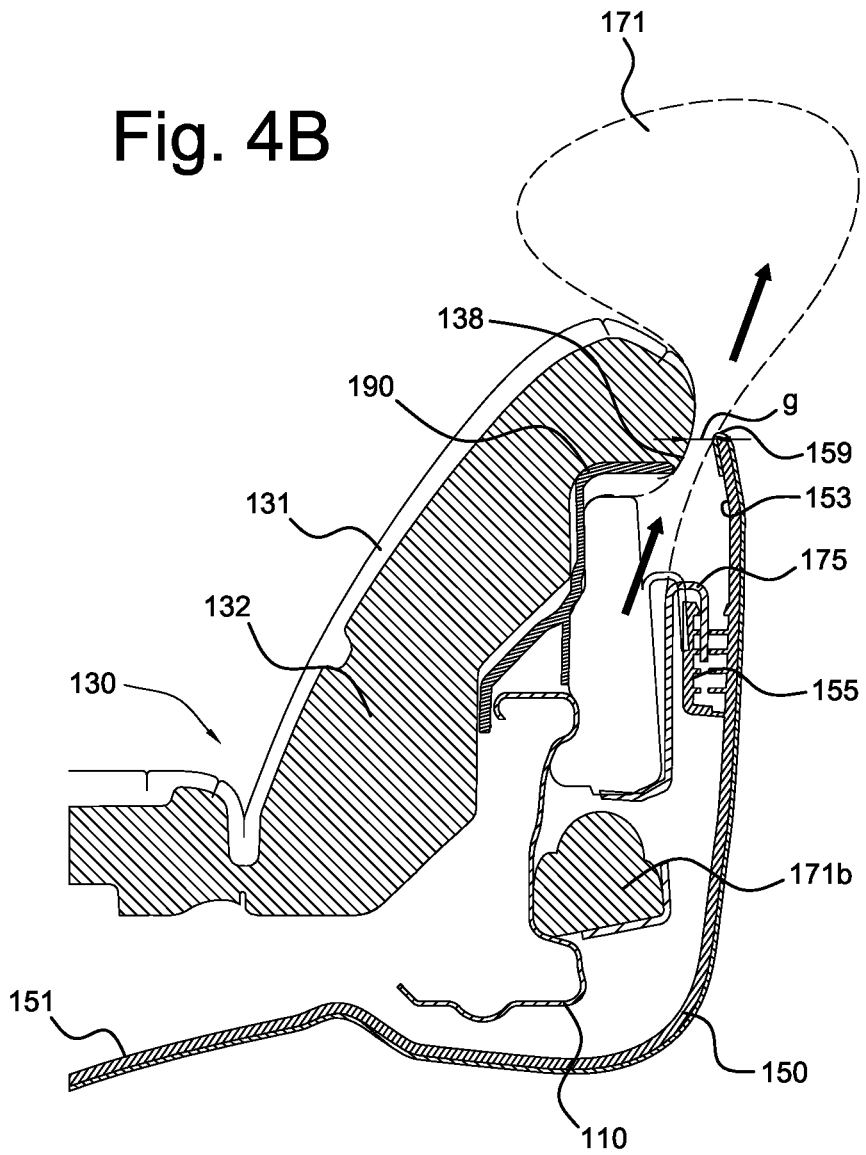

VEHICLE UPPER SEAT PORTION WITH FAR SIDE AIRBAG MODULE

CROSS-REFERENCE TO RELATED APPLICATION

The present disclosure claims the benefit of priority of co-pending European Patent Application No. 20208706.0, filed on Nov. 19, 2020, and entitled "Vehicle Upper Seat Portion With Far Side Airbag Module," the contents of which are incorporated in full by reference herein.

TECHNICAL FIELD

The present disclosure relates to a vehicle seat upper portion having a front side, a rear side, a first lateral side and a second lateral side, and including: a frame structure; upholstery extending at least across the first lateral side of the vehicle seat upper portion; a back panel arranged at the rear side of the frame structure and mounted to the frame structure, the back panel including a main surface and two lateral surfaces; and a far side airbag module mounted on the frame structure and including a side airbag. The back panel typically is a hardback panel that may be made from or include a plastic material, e.g. a thermoset plastic material, a polycarbonate, and/or a polycarbonate composite such as a polycarbonate acrylonitrile butadiene styrene alloy.

The present disclosure further relates to a vehicle seat including such a vehicle seat upper portion, and to a method for attaching a back panel to vehicle seat upper portion.

BACKGROUND

Far side airbag modules have long been integrated in vehicle seats, in particular in the driver's seat and/or front passenger seat. "Far side" in far side airbag module generally refers to the fact that the module is installed for deploying at a lateral side of the vehicle seat that faces towards the longitudinal centre plane of the vehicle, e.g. towards a tunnel console of the vehicle between two seats. When such a far side airbag module deploys, the inflated airbag deploys and helps to cushion a blow to the vehicle's occupants head, in particular during a sideways crash. A back panel having a living hinge which allows a portion of the back panel to hinge outwards upon deployment of the airbag is known, wherein typically, deployment of the airbag involves breaking a connection provided by a weak seam or some kind of friction connection, e.g. using a clip, which connection holds the hingeable portion of the back panel in place relative to the seat while the airbag is not deployed.

A drawback of using such a seam, clips or a friction fit is that these slow down deployment of the airbag. It is an object of the disclosure to provide a vehicle seat upper portion in which this drawback is at least partially overcome.

SUMMARY

According to a first aspect, the disclosure provides a vehicle seat upper portion having a front side, a rear side a first lateral side and a second lateral side, and including: a frame structure; upholstery, extending at least partially along the first lateral side of the vehicle seat upper portion; a back panel, arranged at the rear side of the frame structure and mounted to the frame structure, the back panel including, on a side facing the frame structure, a main surface, a first lateral surface and a second lateral surface; a far side airbag module mounted on the frame structure and including a side airbag. The far side airbag module, on a side facing said back panel, is provided with a first hook, and the back panel, on its first lateral surface, is provided with a second hook engaging the first hook, in this manner pulling the first lateral side of the back panel towards and/or against the upholstery when the airbag is not deployed. The first hook and second hook are adapted for moving laterally away from the frame structure upon deployment of the airbag such that a gap is formed between a distal edge of the first lateral surface of the back panel and the upholstery for passage of the airbag.

When the airbag is not deployed, no connection between the upholstery and the distal edge of the back panel is required to keep the first lateral side of the back panel biased towards upholstery. In particular, no clips or seams or the like are needed for urging the back panel against the upholstery.

Upon deployment of the airbag, the hooks which urged the back panel towards the upholstery, now cause the lateral side of the back panel to deflect away from the frame structure, in this manner creating the gap through which the airbag can deploy quickly. Deflection of the distal edge of the first lateral side of the back panel away from the frame structure, and thus formation of the gap therebetween, starts even before the airbag contacts the distal edge of the back panel. The gap provides a path of least resistance for the airbag to deploy, so that during deployment relatively little force is exerted by the airbag on the surrounding structures within the vehicle seat upper portion, e.g. on the back panel, the frame structure, and an optional side trim list to which the upholstery is typically attached. As a result, the airbag can deploy more quickly than if the airbag were to first have to contact the area near the gap in order to open up the gap.

The first hook and second hook may be adapted for moving laterally away from the frame structure upon deployment of the airbag such that the gap is opened before the airbag contacts the back panel. The first and second hook are arranged for, upon deployment of the airbag, forming the gap of between 5 and 10 mm, e.g. between 7 and 8 mm, before the airbag contacts the back panel or a side trim list of the vehicle seat upper portion.

In an example the first hook and second hook are adapted for remaining engaged with each other during deployment of the airbag. This helps to reduce the risk of another passenger being hit by the first lateral surface of the back panel during deployment of the airbag. The lateral deflection of distal edge of the first lateral surface back panel relative to the frame structure during said deployment may in this manner be limited by the hooks.

When the airbag is arranged at a lateral side facing another seat, by setting a limit to the maximum deflection of the back panel, damage to the seat and its surrounding can be reduced as well. For instance, it may in this manner be avoided that the first lateral side crashes into a console tunnel or the like that is arranged between facing lateral sides of two vehicle seats.

In an example the first and second hook are arranged for disengaging each other when the back panel is slid off the frame structure in a direction away from the frame structure and the upholstery. This allows the back panel to be easily removed from the vehicle seat upper part. Likewise, when an airbag module has already been attached to the frame structure, this allows the back panel to be mounted in a sliding motion onto the frame structure, such that the first and second hook become engaged and the back panel is pulled towards and/or against the upholstery.

In an example, the second hook is arranged between the first lateral surface of the back panel and the airbag, wherein the airbag module may be mounted on a facing lateral surface of the frame structure.

In an example, the first lateral surface of the back panel along the distal edge of the first lateral surface of the back panel is moveable with respect to the upholstery, e.g. in a transverse direction away from the frame. Though the upholstery typically abuts the back panel due to the force exerted on the back panel through the first and second hooks, there is no fixed connection between the upholstery and the distal edge of the first lateral surface of the back panel. The distal edge can thus be moved relative to the upholstery, and independent from the upholstery, without breaking a form fit or any seams connection along the distal edge.

In an example, when seen in side view onto the first lateral side of the vehicle seat upper portion, the first lateral surface of the back panel partially overlaps the upholstery, wherein a strip with a width of at least 10 mm of the upholstery may be overlapped by said lateral surface of the back panel, wherein the overlapping portion of the first lateral surface may contact the upholstery. This results in an aesthetically pleasing lateral side of the vehicle seat upper portion. The width of the overlap may be at most 10 cm when seen in said side view.

The upholstery will typically include a layer of foam covered by a layer of trim, wherein the trim may include leather and/or one or more fabrics.

The first lateral side of the back panel may be formed as a unitary single piece, e.g. including or made from a plastic material such as a polycarbonate or polycarbonate composite, such as a polycarbonate acrylonitrile butadiene styrene alloy.

In an example, the first lateral surface of the back panel is free from any hinge or living hinge. Instead, when the first lateral surface is pushed laterally away from the frame structure this will typically cause bending of the first lateral surface over a larger area.

In an example, the vehicle upper seat portion further includes a side trim list mounted on the frame structure, said side trim list having a first side facing the airbag module, and an oppositely facing second side, and wherein the side trim list generally is spaced apart from the back panel. The side trim list, which is typically mounted on the frame structure near the first lateral side, may be provided with a plurality of slots, and the upholstery includes a flexible lateral edge provided with a plurality of retainer clips, said lateral edge of the upholstery contacting the second side, with the retainer clips being inserted in the slots. The upholstery can thus be attached to the side trim list in the interior of the upper seat part, independent from the back panel. At a location near the side trim list the upholstery may include trim and/or foam which is slightly compressed when the retainer clips are inserted in the slots, causing the upholstery to lie tightly against the first lateral surface of the back panel.

The retainer clips are intended to remain in their corresponding slots during deployment of the airbag, and will typically do so.

In an example, the distal edge of the first lateral surface of the back panel lies against the upholstery and is spaced apart from the side trim list.

According to a second aspect, the disclosure provides a seat for a vehicle, the seat including an upper seat portion according to the disclosure, and further including a lower seat portion, wherein the frame structure of the upper seat portion is supported by the lower seat portion.

According to a third aspect, the disclosure provides a vehicle, such as a passenger car, including a first seat according to the second aspect, and further including a second vehicle seat arranged at the first lateral side of the upper seat part of the first seat. The first lateral side, which upon deployment of the airbag is pushed away from the frame structure of the first seat, thus faces a lateral side of the second seat, so that upon activation the airbag will deploy between these facing lateral sides of the first and second seat.

According to a fourth aspect, the disclosure provides a method for attaching a back panel to a vehicle seat upper portion having a front side, a rear side a first lateral side and a second lateral side, the vehicle seat upper portion further including: a frame structure; and upholstery extending at least partially along the first lateral side; wherein the far side airbag module is mounted on the frame structure and includes a side airbag, and is provided with a first hook; wherein the back panel is adapted to be arranged at the rear side of the frame structure and mounted to the frame structure, and includes, on a side arranged for facing the frame structure when mounted, a first lateral surface on which a second hook is provided; wherein the method includes: sliding the back panel onto the frame structure in a direction towards the frame structure and the upholstery until the first hook engages the second hook in such a manner that the engagement of the first and second hook causes the first lateral surface of the back panel to be pulled towards and/or against the upholstery and such that the first hook and second hook are arranged for moving laterally away from the frame structure upon deployment of the airbag to form a gap between a distal edge of the first lateral surface of the back panel and the upholstery for passage of the airbag.

The method provides a quick and convenient way to mount the airbag module and back panel to a frame structure. No special connections need to be made be between the upholstery and the back panel. Additionally, when the back panel is mounted to the vehicle seat upper portion in accordance with the disclosure, when the airbag deploys, a gap between the back panel and the upholstery is formed even before the airbag contacts the back panel and/or upholstery. Thus, during deployment relatively little force is exerted by the airbag on the surrounding structures within the vehicle seat upper portion, e.g. on the back panel, the frame structure, and an optional side trim list to which the upholstery is typically attached, in this manner facilitating quick deployment of the airbag.

The vehicle seat upper portion may be a vehicle seat upper portion of the disclosure.

In an example, the vehicle seat upper portion further includes a side trim list mounted on the frame structure near the first lateral side, the method further including connecting a flexible lateral edge of the upholstery to the side trim list, prior to sliding the back panel onto the frame structure. The side trim list may be provided with a plurality of slots, and the flexible lateral edge of the upholstery may be provided with a plurality of retainer clips, so that said connecting may include inserting the retainer clips into the slots from a side of the side trim list which faces the far side airbag module. The upholstery is in this manner connected attached, at the lateral edge thereof, to the side trim list, before the back panel is mounted to the vehicle seat upper portion, and no further connections between the upholstery and the back panel are subsequently required.

BRIEF DESCRIPTION OF THE DRAWINGS

The present disclosure will be discussed in more detail below, with reference to the attached drawings, in which:

FIGS. 4A and 4B show a cross-sectional view through plane IV-IV of FIG. 1A, respectively with an airbag module in an undeployed state, and with the airbag module in a state of deployment.

DESCRIPTION OF EMBODIMENTS

Figure 1A:
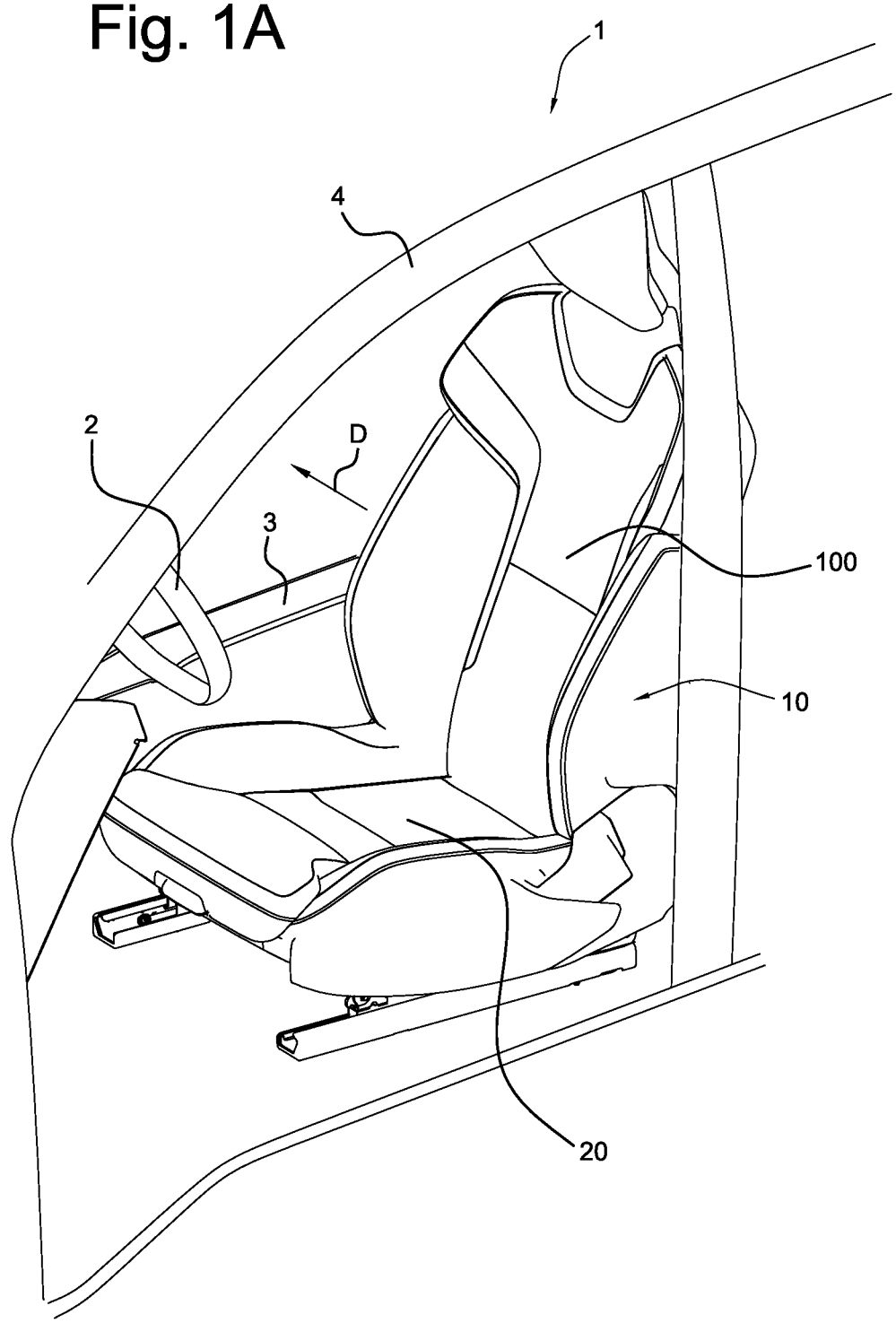
FIGS. 1A and 1B respectively show a perspective view of a vehicle seat including a vehicle seat upper portion according to the present disclosure as part of a vehicle, and of the seat separate from the vehicle.

FIG. 1A shows a perspective view of a portion of a vehicle 1, such as a passenger car, car, with a vehicle seat 10 according to the present disclosure arranged behind a steering wheel 2, wherein the seat 10 is arranged between and spaced apart from a console tunnel 3 and a door frame of the vehicle 1. Though not shown, at the side near the console tunnel 3 the vehicle is provided with a passenger seat. The vehicle seat 10 includes a lower seat portion 20, which supports an upper seat portion 100 in which a far side airbag module is mounted (shown in FIG. 2). The far side airbag module is arranged for deploying the airbag in a direction D, upon which a lateral side of the airbag will be urged outward to contact the console tunnel.

Figure 1B:
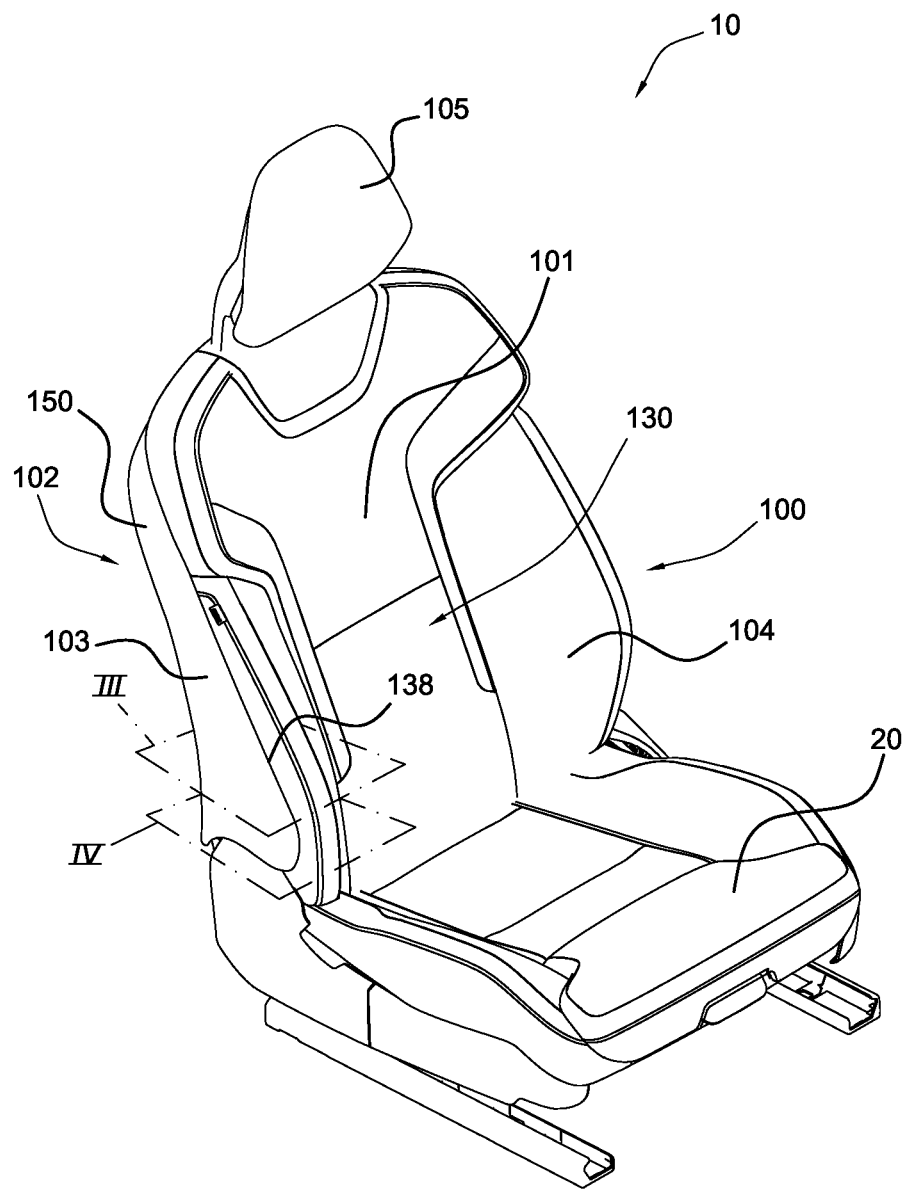

FIG. 1B shows another perspective view of the seat 10, which shows more clearly that the seat upper portion 100 includes a front side 101, for supporting a person's back, a rear side 102 which faces oppositely from the front side 101. The seat upper portion further includes a first lateral side 103, at which the far side airbag module is mounted, and a second lateral side 104. A removable head rest 105 is provided at the top of the seat upper portion. Upholstery 130, including foam covered by trim, substantially covers the front side 101 of the upper portion, and partially extends from the front side 101 to the outward facing first and second lateral sides 103,104. A back panel 150 covers the rear side 102 of the seat upper portion and extends to the first and second lateral sides 103,104 such that lateral sides of the back panel partially overlap the upholstery 130 at these lateral sides of the upper seat, in a manner that part of the upholstery, e.g. a strip of at least 3 cm, lies on the interior of the lateral sides of the back panel, in contact therewith. In case of deployment, the airbag will emerge between a lateral side of the back panel 150, and lateral edge 138 of the upholstery 130.

Figure 2A:
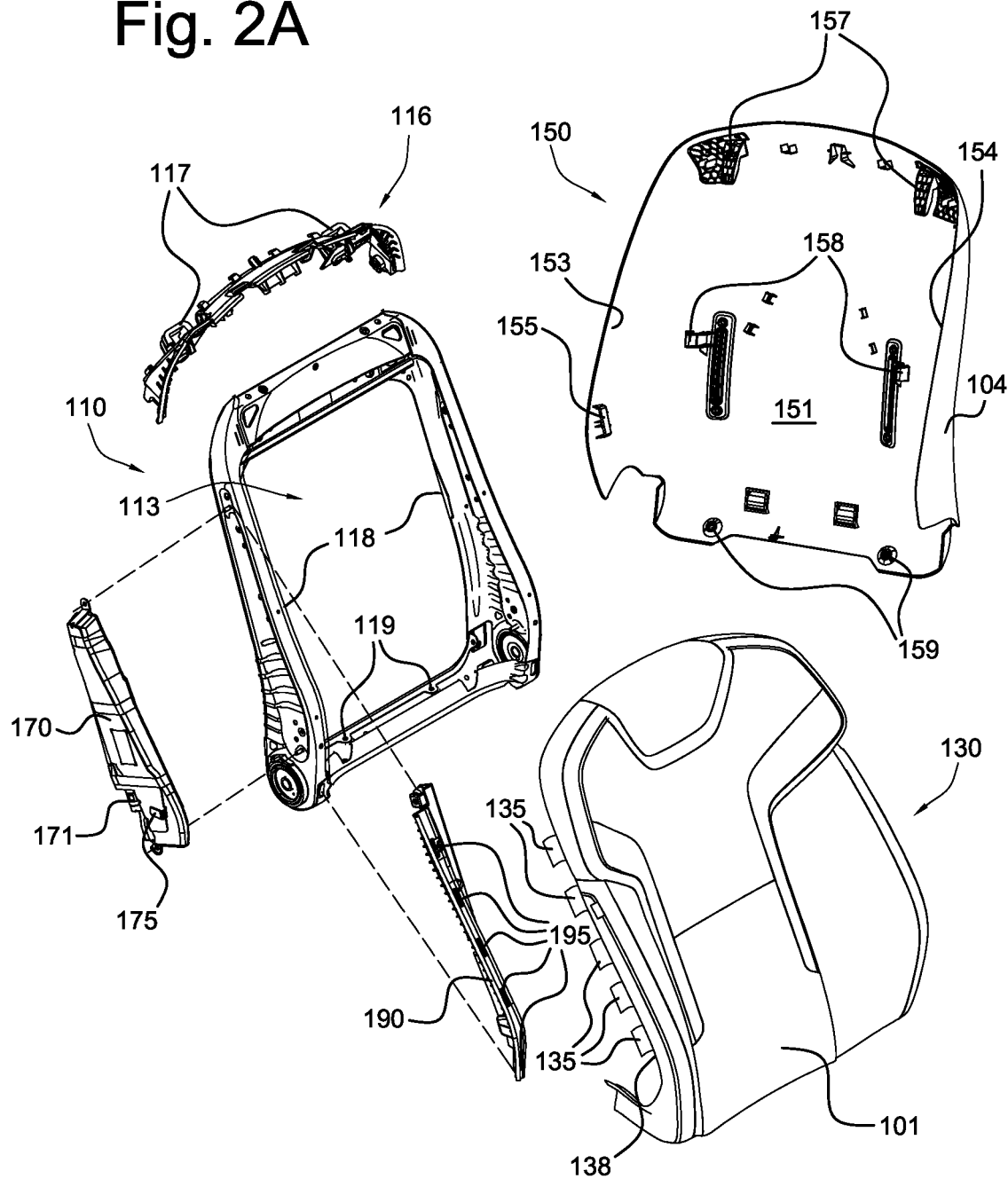
FIGS. 2A, 2B and 2C respectively show an exploded view of the vehicle seat upper portion of FIGS. 1A and 1B, a detail of a side trim list and retainer clips for attaching the upholstery to the side trim list, and a detail of the first and second hook.

FIG. 2A shows an exploded view of the upper seat portion 10, in in addition to the lower seat portion 20, also the head rest 105 has been omitted for reasons of clarity. The upper seat portion includes a frame structure 110, typically made from a metal or metal alloy, with a lateral side to which a far side airbag module 170. At a top side of the frame structure 110 an attachment plate 116 is provided, typically made substantially from a non-metallic material such as a plastic, which is fixed to the frame structure 110 and includes brackets 117 to be engaged by downwardly oriented hooks 157 at the top of the inner side of the back panel 150. The inner side of the back panel further is provided with two snap hooks 158 which are arranged for snapping engagement against lateral edges 118 of inner opening 113 of the frame structure 110.

At the side of the frame structure 110 where the airbag module is mounted, a side trim list 190 is provided. A number of slots 195 are provided in the side trim list for receiving therein corresponding retainer clips 135 of a flexible lateral edge 138 of the upholstery. As illustrated more clearly in FIG. 3, the clips are to be inserted into the slots from a side of the side trim list facing the rear of the upper seat portion, when the back panel has not yet been attached to the frame.

The airbag module 170 includes an airbag, shown in FIG. 2A in an undeployed state. The airbag module further includes a first hook 175 on a side facing away from the frame structure and towards the back panel when the back panel is mounted to the frame structure.

The first hook 175 is arranged for engaging a second hook 155 that is provided on the interior side of first lateral surface 153 of the back panel 150. When the airbag module 170 and the side trim list 190 have been fixed to the frame structure 110, and when the clips 135 that are provided at the flexible lateral edge 138 of the upholstery 130 have been inserted in corresponding slots 190, the back panel 150 can be attached to the frame structure in a sliding motion in which the hooks 157 fall into brackets 117, hooks 158 snap to the lateral edges 118 of inner opening 113, and in which second hook 155 of the lateral side 153 of the back panel engages the first hook 175 of the airbag module 170.

Figure 2B:
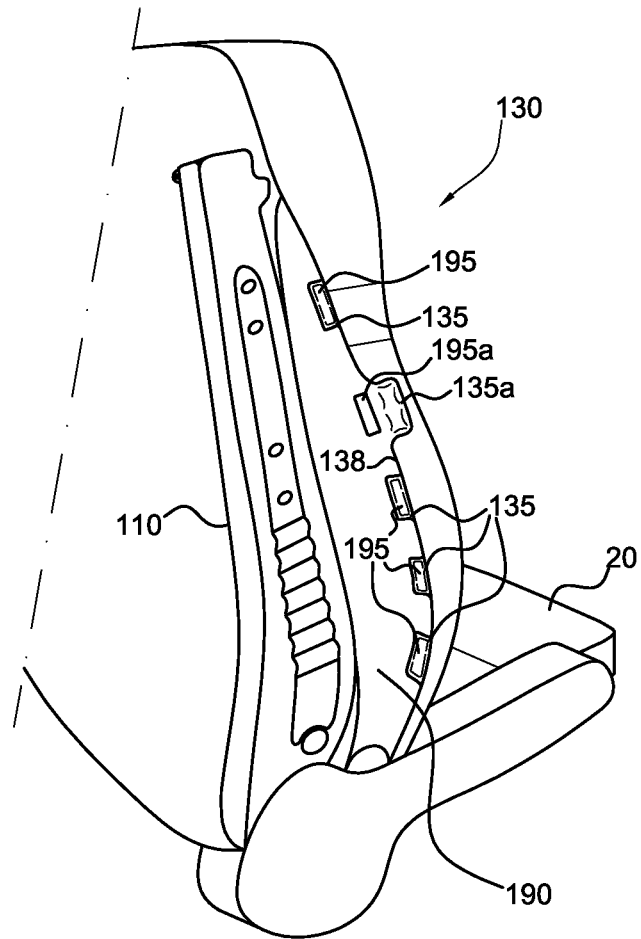

FIG. 2B shows a partial perspective view of the seat of FIG. 1, with the back panel omitted, in order to illustrate how the clips 135 are inserted into corresponding slots 195, here shown in dotted lines, in the side trim list 190. Retainer clips have been inserted into all of the slots 195, except slot 195a into which corresponding clip 135a still is to be inserted. As can be seen, the clips are attached to a flexible lateral edge portion 138 of the upholstery 130, and are to be inserted into the slots from a side of the side trim list which faces the rear of the upper seat portion, so that the lateral edge portion 138 is partially folded around the side trim list 190.

Figure 2C:
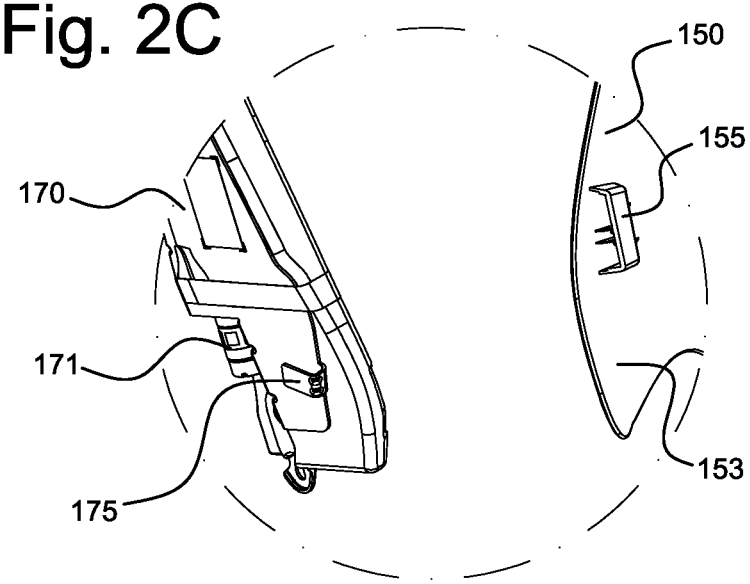

FIG. 2C shows a detail of the first hook 155 that is arranged on the inner side of the first lateral edge of the back panel 150, and of the second hook 157 that is provided on the airbag module.

Figure 3:
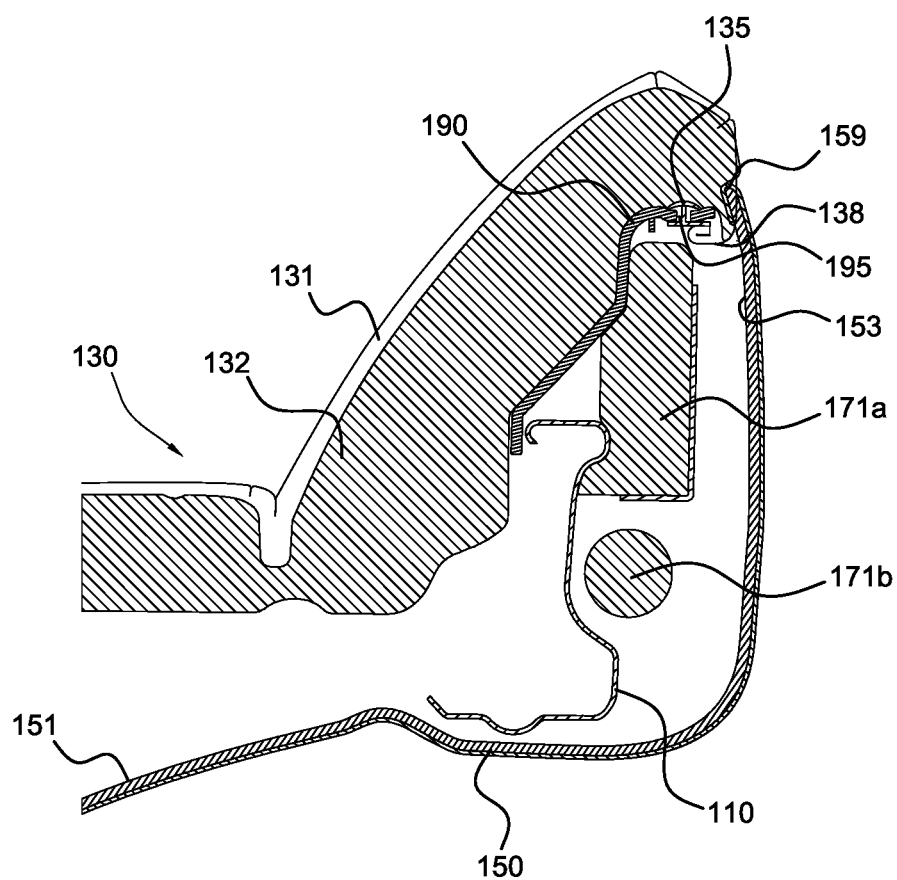
FIG. 3 shows a cross-sectional view through plane of FIG. 1B.

FIG. 3 shows a cross-sectional view of part of the upper seat portion 10, though plane III of FIG. 2. Plane III intersects a slot 195 of the side trim list 190, as well as a retainer clip 135 that is attached to edge portion 138 of the upholstery 130. The upholstery includes a layer of foam 132 which is covered on an outer side by a thinner layer of trim 131. The edge portion 138 is partially overlapped by the lateral edge 153 of the back panel 150.

In the cross-sectional view of FIG. 3, the airbag of the airbag module has not deployed, and two portions 171a, 171b of the airbag are visible.

Figure 4A:
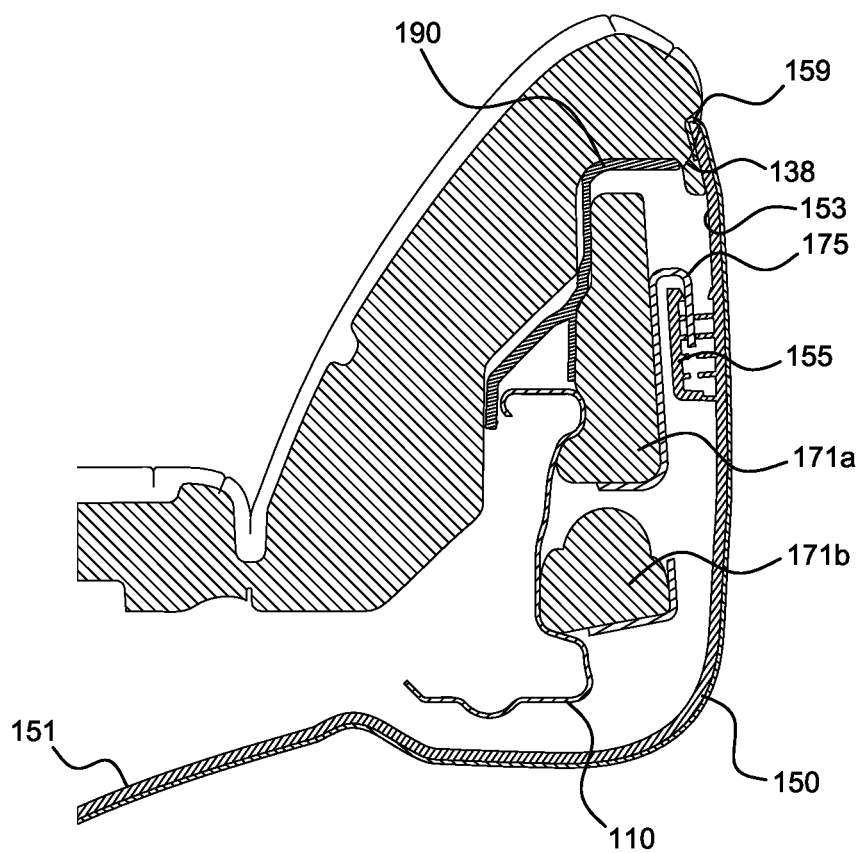

FIG. 4A shows a cross-sectional view of part of the upper seat portion 10, though plane IV of FIG. 2, also while the airbag has not yet deployed. Plane IV intersects the first hook 175 of the airbag module 170 which engages the second hook 155 of the back panel 150. The first and second hook together urge the inner side of the lateral edge 153 of the back panel against the lateral edge 138 of the upholstery 130. However, there is no direct fixed connection between the upholstery 138 and the lateral side 153 of the back panel 150. If the airbag module were not installed, the lateral edge 153 of the back panel could be moved away from the lateral edge 138 of the upholstery, for instance by pulling the distal edge 159 away from the side trim list 190.

FIG. 4B shows a cross-sectional view of part of the upper seat portion 10 through plane IV of FIG. 2, during deployment of the airbag. Deployment of the airbag has caused the second hook 175 to move laterally away from the frame structure 110, in this manner also urging the first hook 155 and the lateral edge 153 of the back panel outwards. In this manner, and as the lateral edge 153 of the back panel is not fixed or connected directly to the upholstery 130, an initial gap g of about 6-7 mm is formed between the distal edge 159 of the back panel and the upholstery, even before the airbag 171 comes into contact with the back panel 150 or the side trim list 150. In this manner the airbag can inflate out of the interior of the upper seat portion through the gap.

In summary, the disclosure provides a vehicle seat upper portion, having a front side, a rear side, a first lateral side and a second lateral side, and including: a frame structure; upholstery extending at least across the first lateral side and having an edge that is attached to a side trim list; a back panel arranged at the rear side of the frame structure and mounted to the frame structure, the back panel including a main surface and two lateral surfaces; and a far side airbag module mounted on the frame structure and including a side airbag, wherein the airbag module, on a side thereof facing away from the frame structure, is provided with a first hook, and wherein the back panel on an inner lateral side thereof is provided with a second hook for engaging the first hook in such a manner that upon deployment of the airbag of the airbag module, the first hook and second hook urge the lateral side of the back panel away from the upholstery to form a gap between the back panel and the upholstery for passage of the airbag, before the fabric of the airbag contacts any of the back panel, upholstery and/or side trim list. As the gap, e.g. of between 5 mm and 10 mm is formed by lateral movement of the hooks relative to the frame structure, rather than by contact with the fabric of the airbag as it inflates, delay of deployment of the airbag due to it having to break a connection is avoided.

The present disclosure has been described above with reference to a number of exemplary embodiments as shown in the drawings. Modifications and alternative implementations of some parts or elements are possible, and are included in the scope of protection as defined in the appended claims.

The invention claimed is:

1. A vehicle seat upper portion having a front side, a rear side, a first lateral side and a second lateral side, the vehicle seat upper portion comprising:
    a frame structure;
    upholstery, extending at least partially along the first lateral side of the vehicle seat upper portion;
    a back panel, arranged at the rear side of the frame structure and mounted to the frame structure, the back panel comprising, on a side facing the frame structure, a main surface, a first lateral surface and a second lateral surface; and
    a far side airbag module mounted on the frame structure and comprising a side airbag;
    wherein the far side airbag module, on a side facing said back panel, is provided with a first hook, and wherein said back panel on its first lateral surface, is provided with a second hook engaging the first hook, in this manner pulling the first lateral side of the back panel towards and/or against the upholstery when the airbag is not deployed, and wherein the first hook and second hook are adapted for moving laterally away from the frame structure upon deployment of the airbag such that a gap (g) is formed between a distal edge of the first lateral surface of the back panel and the upholstery for passage of the airbag.

2. The vehicle upper seat portion according to claim 1, wherein the first hook and second hook are adapted for moving laterally away from the frame structure upon deployment of the airbag such that the gap is opened before the airbag contacts the hardback.

3. The vehicle upper seat portion according to claim 1, wherein the first hook and second hook are adapted for remaining engaged with each other during deployment of the airbag, in this manner limiting lateral deflection of the first lateral surface hardback relative to the frame structure during said deployment.

4. The vehicle upper seat portion according to claim 1, wherein the first and second hook are arranged for disengaging each other when the back panel is slid off the frame structure in a direction away from the frame structure and the upholstery.

5. The vehicle upper seat portion according to claim 1, wherein the second hook is arranged between the first lateral surface of the back panel and the airbag.

6. The vehicle upper seat portion according to claim 1, wherein the first lateral surface of the back panel along the distal edge of the first lateral surface of the back panel is moveable with respect to the upholstery.

7. The vehicle upper seat portion according to claim 1, wherein, when seen in side view onto the first lateral side of the vehicle seat upper portion, the first lateral surface of the back panel partially overlaps the upholstery.

8. The vehicle upper seat portion according to claim 1, further comprising a side trim list mounted on the frame structure near the first lateral side and provided with a plurality of slots, wherein the upholstery comprises a flexible lateral edge provided with a plurality of retainer clips, said side trim list having a first side facing the airbag module, and an oppositely facing second side, wherein the lateral edge of the upholstery contacts the second side, with the retainer clips inserted in the slots.

9. The vehicle upper seat portion according to claim 8, wherein the retainer clips are adapted for remaining in their corresponding slots during deployment of the airbag.

10. The vehicle upper seat portion according to claim 8, wherein the distal edge of the first lateral surface of the back panel lies against the upholstery and is spaced apart from the side trim list.

11. The vehicle upper seat portion according to claim 1, wherein the upholstery comprises a layer of foam covered by a layer of trim.

12. The vehicle upper seat portion according to claim 1, wherein the first lateral side of the back panel is formed as a unitary single piece.

13. A seat for a vehicle, the seat comprising:
    a vehicle seat upper portion having a front side, a rear side, a first lateral side and a second lateral side, the vehicle seat upper portion comprising:
        a frame structure;
        upholstery, extending at least partially along the first lateral side of the vehicle seat upper portion;
        a back panel, arranged at the rear side of the frame structure and mounted to the frame structure, the back panel comprising, on a side facing the frame structure, a main surface, a first lateral surface and a second lateral surface; and
        a far side airbag module mounted on the frame structure and comprising a side airbag;

wherein the far side airbag module, on a side facing said back panel, is provided with a first hook, and wherein said back panel on its first lateral surface, is provided with a second hook engaging the first hook, in this manner pulling the first lateral side of the back panel towards and/or against the upholstery when the airbag is not deployed, and wherein the first hook and second hook are adapted for moving laterally away from the frame structure upon deployment of the airbag such that a gap (g) is formed between a distal edge of the first lateral surface of the back panel and the upholstery for passage of the airbag; and a vehicle seat lower portion, wherein the frame structure of the vehicle seat upper portion is supported by the vehicle seat lower portion.

14. The seat according to claim 13, further comprising a second seat arranged at the first lateral side of the vehicle seat upper portion of the seat.

15. A method for attaching a back panel to a vehicle seat upper portion which has a front side, a rear side a first lateral side and a second lateral side, the vehicle seat upper portion comprising: a frame structure and upholstery extending at least partially along the first lateral side, wherein the far side airbag module is mounted on the frame structure and comprises a side airbag, and is provided with a first hook, and wherein the back panel is adapted to be arranged at the rear side of the frame structure and mounted to the frame structure, and comprises, on a side arranged for facing the frame structure when mounted, a first lateral surface on which a second hook is provided, the method comprising:

sliding the back panel onto the frame structure in a direction towards the frame structure and the upholstery until the first hook engages the second hook in such a manner that the engagement of the first and second hook causes the first lateral surface of the back panel to be pulled towards and/or against the upholstery and such that the first hook and second hook are arranged for moving laterally away from the frame structure upon deployment of the airbag to form a gap (g) between a distal edge of the first lateral surface of the back panel and the upholstery for passage of the airbag.

* * * * *